J. DAVIS.
Steam-Washers.

No. 137,296. Patented April 1, 1873.

WITNESSES
David J. Butler.
E. H. Ober.

Jacob Davis  INVENTOR

By his Att'ys
Henry W. Williams & Co.

UNITED STATES PATENT OFFICE.

JACOB DAVIS, OF FLORIDA, MASSACHUSETTS.

IMPROVEMENT IN STEAM-WASHERS.

Specification forming part of Letters Patent No. 137,266, dated April 1, 1873; application filed February 5, 1873.

*To all whom it may concern:*

Be it known that I, JACOB DAVIS, of Florida, in the county of Berkshire and State of Massachusetts, have invented a new and useful Improvement in Steam-Washers, of which the following is a specification:

My invention is intended to be used in washing cloth, clothes, bedding, &c., of all kinds without wearing or straining the clothes or injuring them in any manner. The main principle of this invention is the same as that in my invention for which Letters Patent of the United States were granted to me September 10, 1872. The construction of this invention, however, is somewhat different from that described in the said Letters Patent, and this invention is intended as an improvement upon that shown in the Letters Patent above named.

My invention can be used in connection with any vessel of any kind, whether large or small, provided it is water-tight. Perhaps a common boiler, such as is commonly used for boiling clothes, is as convenient as anything, although any other suitable vessel may be used.

The nature of my device is fully described below.

Figure 1:
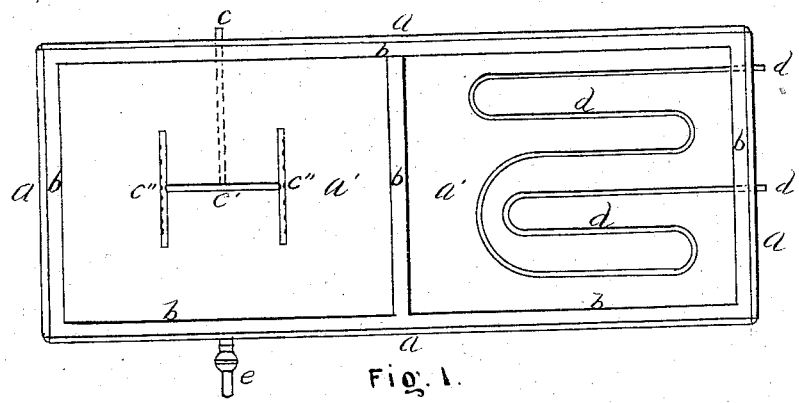
Figure 2:
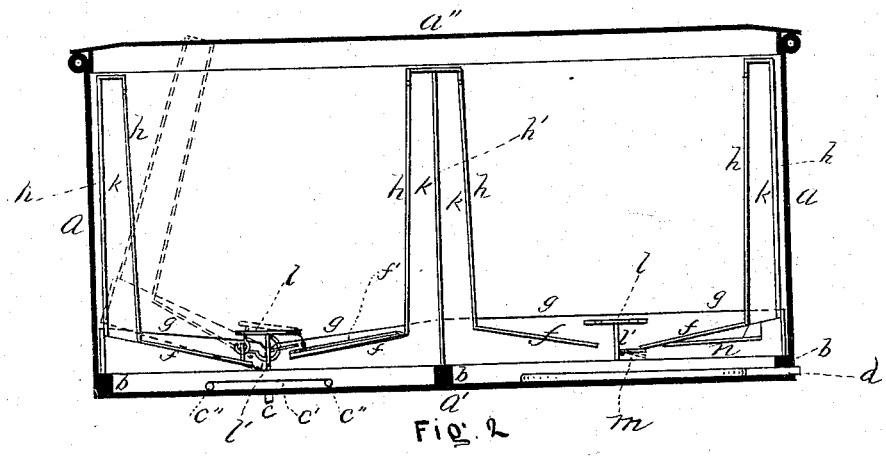
Figure 3:
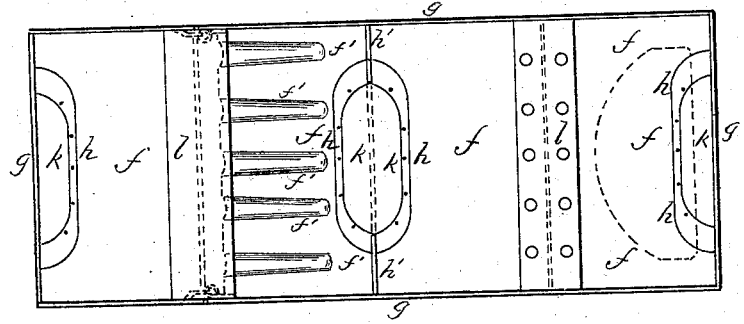

In the accompanying drawing, Figure 1 is a plan of the bottom of an ordinary vessel, which is fitted up especially for the accommodation of my steam-washer, as below described. Fig. 2 is a vertical longitudinal section of my washer, and of the said vessel into which it is placed. Fig. 3 is a plan of the steam-washer apart from the vessel into which it is set.

Similar letters of reference indicate corresponding parts.

The steam-washer represented in the drawing is what might be called a double washer, and is so constructed and represented in order to show certain parts more plainly, and also to exhibit certain variations in its construction.

*a* represents a common vessel, into which my washer tightly fits. Any other vessel can be used provided it be water-tight and the washer fits into it. The vessel *a* is no part of my invention. *a'* is the bottom of the vessel. *a''* is the cover of the same. *b* is a strip of steatite or soap-stone, or other suitable material, laid around the sides and ends and across the center of the lower portion of the vessel, dividing it into two parts. The rim and dividing-partition of the washer rest upon this support *b*, when desired, and more especially when heat is communicated to the washer by means of steam or hot-water pipes. However, the support *b* may not always be used, even in the case of the use of the said pipes; but the rim may be made wider and cut to fit over the pipes holding steam and hot water. *c* represents a pipe bringing steam into the space beneath the washer and above the bottom *a'* of the vessel *a*. The steam enters through the pipe *c*, and passes out under the washer, in this instance in four parts, through the pipes *c' c''*. *d* represents a steam or hot-water pipe, which enters the space beneath the washer, and, passing around in different directions, heats the water in the said space, and then passes out without emptying its contents into the space below the washer. *e* is an ordinary cock, to be used in drawing off the water. *f* is the inclined bottom of the washer, the highest parts being nearest the flues. *h* is an upright, or nearly upright, plate, of which there are six in the drawing, which, when closed at the top, forms three flues, and a perpendicular dividing-partition divides the center flue into two parts, making four in all. Near the highest point in the plates, and in those portions which face the interior of the vessel holding the washer, are perforations opening into the vessel. Tubes, shorter or longer, may be used instead of mere perforations, if desired. The plate or plates *h* form flues *k*, which are usually made to conform in shape to the vessel into which they are fitted, being flat or rounded, or of any other desired shape. *l* is a plate, extending entirely across the washer, made a little wider than the space between different parts of the bottom *f*. This space also extends entirely across the washer. The plate *l* may be a plain whole plate, or a perforated one, or it may be entirely made of wire-netting, in which latter case it might rest partially upon the bottom *f*. One of the plates *l* shown in the drawing is hinged and hooked down for reasons which will be explained below. The other is fixed to the rim *g* at each end. The rim *g* extends entirely around the washer, supporting it, and resting upon the steatite support *b*. When the support *b* is not placed in the vessel $a$ the rim $g$ rests upon and fits tightly to the bottom $a'$. The plates $l$ are mainly supported by the perpendicular plates $l'$, which extend entirely across the vessel $a$, fitting to the bottom $a'$, when the support $b$ is removed, and, with the dividing-plate $h'$, separating the space between the bottoms $f$ and $a'$ into four portions or chambers. $m$ is a swinging valve, hung from the plate $l'$, and preventing the water from pushing up under the clothes between the plate $l'$ and bottom $f$, while it allows the descending water to flow down and back. $n$ is a guard-plate, intended to prevent the water from overheating the bottom $f$, and thus cause the water above the bottom $f$ to boil.

In practical operation my improved washer operates as follows: Upon applying the heat by the pipes $c$ $c'$ $c''$ or pipe $d$, or merely by placing the vessel $a$ with the washer inside upon a heating apparatus of any kind, the water below the bottom $f$ heats and soon boils. When rapid boiling commences the hot water is forced up the vertical passages or flues $k$, and spurts out with considerable force through the holes or tubes in the plates $h$ upon the clothes in the interior of the vessel $a$; then, rapidly passing through the clothes, it passes down, opening the valve $m$, and is forced back into the flues $k$, and thus a continuous circulation of water goes on, there being no obstruction to the flow of the water, and the clothes are soon washed.

Let it be understood that the clothes are not boiled—the boiling all proceeds under the bottom $f$; also, that they are not cleansed by steam, excepting in the sense that steam may act as a motive power. They are cleansed by a freely-circulating volume of hot water, and they come into contact with nothing else.

Here may be more fully explained the operation of the guard-plate $n$. If it were not for this plate $n$ the bottom $f$ might become so heated that the water upon the upper side would commence to boil; this would tend to neutralize the power of the boiling water under the bottom $f$; hence the guard-plate $n$ is interposed between the bottom $f$ and the source of heat.

In order to increase the inclination of the bottom $f$, corrugations may be placed in it, as seen in Fig. 3, thus adding velocity to the water as it is forced into the flues $k$.

In order that the washer may be placed into a vessel having upper edges projecting inwardly, it may be hinged (see Fig. 2) by means of the rim $g$, the plate $l$ also being hinged, as above remarked.

The washer may be made of any material, and in some cases a rim may be unnecessary.

It will be seen by reference to the drawing that there are two places or receptacles for clothes and four flues. As many, more or less, flues may be used as may be desired, depending on the size of the vessel into which a washer is placed. As each flue with its attachments is a complete washer, there are, in reality, four distinct washers shown in the drawing.

Having thus fully described my invention, what I claim as my invention, and as my improvement over the Letters Patent above referred to, is—

1. The arrangement of the hinged rim $g$ and hinged plate $l$, substantially as and for the purpose hereinbefore specified.

2. The guard-plate $n$, when combined with the bottom $f$, constructed substantially as above described.

3. The arrangement of the valve $m$ with the plate $l'$ and bottom $f$, as and for the purpose above set forth.

4. The corrugated bottom $f$ $f'$, arranged in combination with plate $h$ and flue $k$, as above specified.

5. The arrangement of the steam-washer above described with the support $b$ and pipes $c$ $c'$ $c''$, and also with the pipe $d$, for the purpose of using steam or hot water as a heater or for motive power, as specified above.

JACOB DAVIS.

Witnesses:
 HENRY W. WILLIAMS,
 DAVID J. BUTLER.